United States Patent
Okamoto et al.

(10) Patent No.: US 6,755,992 B2
(45) Date of Patent: Jun. 29, 2004

(54) LIQUID CRYSTALLINE POLYESTER AND METHOD FOR PRODUCING THEREOF

(75) Inventors: Satoshi Okamoto, Tsukuba (JP); Manabu Hirakawa, Tsukuba (JP); Shinji Ootomo, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/289,330

(22) Filed: Nov. 7, 2002

(65) Prior Publication Data

US 2003/0116752 A1 Jun. 26, 2003

(30) Foreign Application Priority Data

Nov. 12, 2001 (JP) ........................................ 2001-345928
Apr. 26, 2002 (JP) ........................................ 2002-126186

(51) Int. Cl.[7] ........................ C09K 19/20; C09K 19/52; C09K 19/38; C08G 63/02; C08G 63/06
(52) U.S. Cl. ............................. 252/299.67; 252/299.01; 252/299.62; 252/299.64; 252/299.66; 528/190; 528/194; 528/302; 528/308
(58) Field of Search ................. 252/299.01, 299.62, 252/299.64, 299.66, 299.67; 528/190, 194, 302, 308

(56) References Cited

U.S. PATENT DOCUMENTS

| | | |
|---|---|---|
| 4,219,461 A | 8/1980 | Calundann |
| 5,278,254 A * | 1/1994 | Furuta et al. ............... 525/397 |
| 6,512,079 B2 * | 1/2003 | Okamoto et al. ........... 528/272 |
| 6,680,002 B2 * | 1/2004 | Yamauchi et al. ..... 252/299.01 |
| 2002/0055607 A1 | 5/2002 | Okamoto et al. |

FOREIGN PATENT DOCUMENTS

| | | |
|---|---|---|
| JP | 54-77691 A | 6/1979 |
| JP | 2002-146003 A | 5/2002 |

* cited by examiner

*Primary Examiner*—Shean C. Wu
(74) *Attorney, Agent, or Firm*—Sughrue Mion, PLLC

(57) ABSTRACT

The present invention provide a liquid crystalline polyester that can be used in production of a molded article having sufficient mechanical strengths in which the melted liquid crystalline polyester has sufficient fluidity in thin-walled portions when the thin-walled molded article is manufactured, and to provide a method for producing the liquid crystalline polyester. A liquid crystalline polyester obtained by copolymerizing 4-acyloxybenzoic acids (I) and 2-acyloxy-6-naphthoic acids (II) in the presence of an imidazole (V) can be used in production of a molded article in which the melted liquid crystalline polyester has sufficient fluidity in thin-walled portions when the thin-walled molded article is manufactured, and which has sufficient mechanical strengths as well, thereby completing the present invention. Further, a liquid crystalline polyester obtained by copolymerizing 4-acyloxybenzoic acids (I), 2-acyloxy-6-naphthoic acids (II), 4,4'-diacyloxybiphenyls (III) and phthalic acids (IV) in the presence of an imidazole (V) can be used in production of a molded article in which the melted liquid crystalline polyester has sufficient fluidity in thin-walled portions when the thin-walled molded article is manufactured, and which has sufficient mechanical strengths as well, thereby completing the present invention.

7 Claims, 1 Drawing Sheet

LIQUID CRYSTALLINE POLYESTER AND METHOD FOR PRODUCING THEREOF

FIELD OF THE INVENTION

The present invention relates to a liquid crystalline polyester and a method for producing thereof.

BACKGROUND OF THE INVENTION

Liquid crystalline polyesters are useful as thermoplastic resins excellent in heat resistance. Especially, a liquid crystalline polyester composed of 4-hydroxybenzoic acid and 2-hydroxy-6-naphthoic acid has been widely used primarily in the electrical and electric field.

Japanese Patent Laid-Open No. 54-77691 discloses a liquid crystalline polyester obtained by polymerizing p-acetoxybenzoic acid and 2-acetoxy-6-naphthoic acid at 250–320° C. However, the fluidity of the obtained liquid crystalline polyester is insufficient in thin-walled portions when a thin-walled article is molded, and the mechanical strengths such as the tensile strength of the molded article obtained is not sufficient.

Further, a liquid crystalline polyester composed of four units derived from 4-hydroxybenzoic acid, 2-hydroxy-6-naphthoic acid, 4,4'-dihydroxybiphenyl and terephthalic acid has been widely used primarily in the electrical and electric field. However, such liquid crystalline polyester has the same problem as above.

As products have been made thinner and smaller in recent electrical and electric fields, there has been required the development of a liquid crystalline polyester that can be used in production of a molded article having sufficient mechanical strengths in which the melted liquid crystalline polyester has sufficient fluidity in thin-walled portions when the thin-walled molded article is manufactured.

SUMMARY OF THE INVENTION

The object of the present invention is to provide a liquid crystalline polyester that can be used in production of a molded article having sufficient mechanical strengths in which the melted liquid crystalline polyester has sufficient fluidity in thin-walled portions when the thin-walled molded article is manufactured, and to provide a method for producing the liquid crystalline polyester.

The present inventors carried out studies earnestly to find a liquid crystalline polyester and a method for production thereof without the above problems, and the inventors found out that a liquid crystalline polyester obtained by copolymerizing 4-acyloxybenzoic acids (I) and 2-acyloxy-6-naphthoic acids (II) in the presence of an imidazole (V) can be used in production of a molded article in which the melted liquid crystalline polyester has sufficient fluidity in thin-walled portions when the thin-walled molded article is manufactured, and which has sufficient mechanical strengths as well, thereby completing the present invention.

The present inventors also found that a liquid crystalline polyester obtained by copolymerizing 4-acyloxybenzoic acids (I), 2-acyloxy-6-naphthoic acids (II), 4,4'-diacyloxybiphenyls (III) and phthalic acids (IV) in the presence of an imidazole (V) can be used in production of a molded article in which the melted liquid crystalline polyester has sufficient fluidity in thin-walled portions when the thin-walled molded article is manufactured, and which has sufficient mechanical strengths as well, thereby completing the present invention.

That is, the present invention provides a liquid crystalline polyester obtained by copolymerizing a 4-acyloxybenzoic acid of Formula (I):

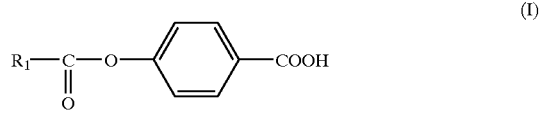

(I)

(wherein $R_1$ represents an alkyl group of 1 to 5 carbon atoms), and a 2-acyloxy-6-naphthoic acid of Formula (II):

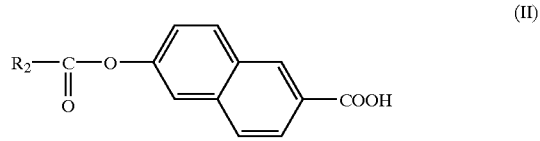

(II)

(wherein $R_2$ is an alkyl group of 1 to 5 carbon atoms), in the presence of imidazoles of Formula (V):

(V)

(wherein $X_1$ to $X_4$ represent a hydrogen atom, or each independently represents an alkyl group, hydroxymethyl group, cyanoalkyl group, carboxyl group, aminoalkyl group, phenyl group, benzyl group or formyl group.).

The present invention also provides a liquid crystalline polyester obtained by copolymerizing above 4-acyloxybenzoic acid of the above Formula (I), 2-acyloxy-6-naphthoic acid of the above Formula (II), a 4,4'-diacyloxybiphenyls of Formula (III):

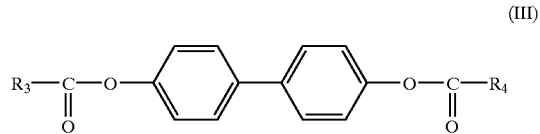

(III)

(wherein $R_3$ and $R_4$ represent independently alkyl groups of 1 to 5 carbon atoms), and a phthalic acid of Formula (IV):

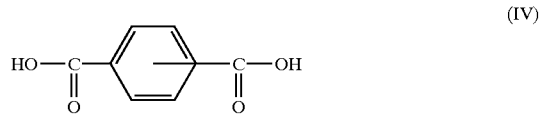

(IV)

in the presence of imidazoles of the above Formula (V).

DETAILED DESCRIPTION OF THE INVENTION

Figure 1:
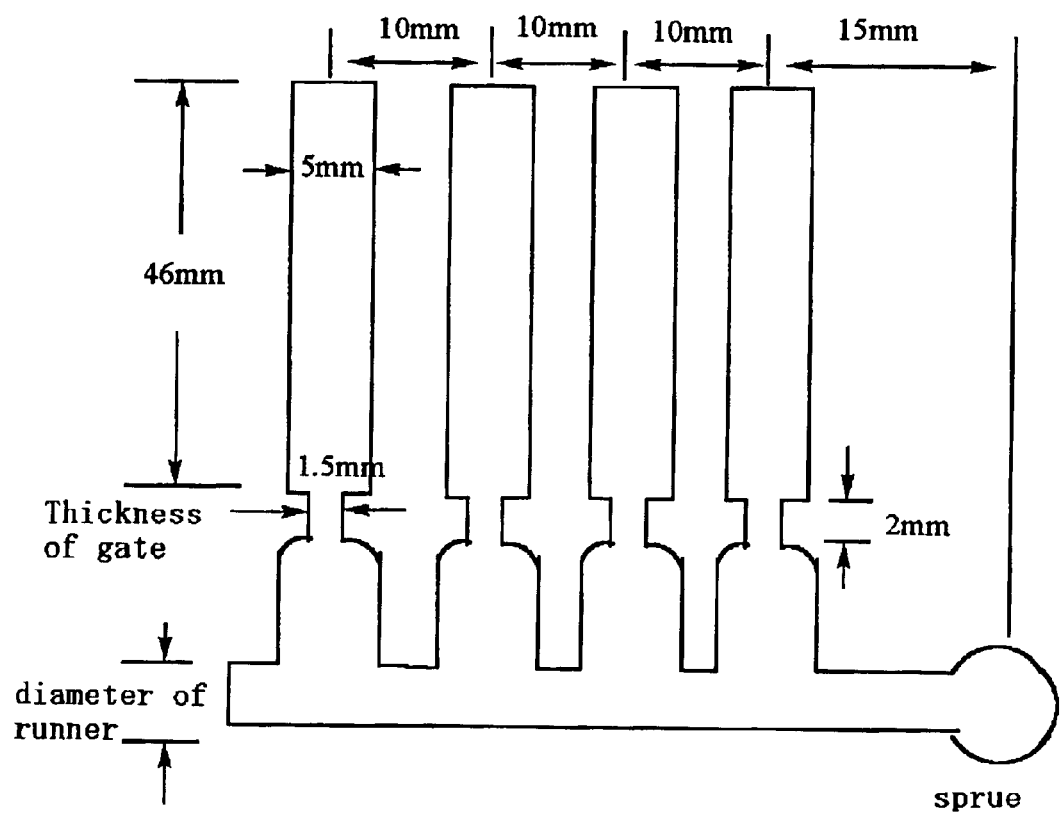
FIG. 1 is a schematic diagram of a molding article used to measure a thin wall flow length.
Product thickness: 0.3 mm, Runner: φ4.0 mm,
Gate: 0.3 T×1.5 W×2.0 L

The present invention will be discussed in detail hereinafter.

In a 4-acyloxybenzoic acid of Formula (I), $R_1$ represents an alkyl group of 1 to 5 carbon atoms. Alkyl groups of 1 to 5 carbon atoms include, for example, a methyl group, ethyl group, n-propyl group, iso-propyl group, n-butyl group, sec-butyl group, tert-butyl group, and pentyl group. Examples of 4-acyloxybenzoic acids (I) include 4-acetoxybenzoic acid, 4-propoxybenzoic acid, 4-butyloxybenzoic acid and 4-valeroxybenzoic acid. These 4-acyloxybenzoic acids may be used singly or in combination of two or more species. Among these, 4-acetoxybenzoic acid is preferably used from the viewpoint of price and availability.

In a 2-acyloxy-6-naphthoic acid of Formula (II), $R_2$ represents an alkyl group of 1 to 5 carbon atoms. Alkyl groups of 1 to 5 carbon atoms include, for example, a methyl group, ethyl group, n-propyl group, iso-propyl group, n-butyl group, sec-butyl group, tert-butyl group, and pentyl group. 2-Acyloxy-6-naphthoic acids (II) include, for example, 2-acetoxy-6-naphthoic acid, 2-propoxy-6-naphthoic acid, 2-butyloxy-6-naphthoic acid, and 2-valeroxy-6-naphthoic acid. These 2-acyloxy-6-naphthoic acids may be used singly or in combination of two or more species. Among these, 2-acetoxy-6-naphthoic acid is preferably used from the viewpoint of price and availability.

In imidazoles of Formula (V), $X_1$ to $X_4$ each independently represent a hydrogen atom, an alkyl group, hydroxymethyl group, cyanoalkyl group, carboxyl group, aminoalkyl group, phenyl group, benzyl group or formyl group.

Alkyl groups are preferably alkyl groups of about 1 to 4 carbon atoms, which include, for example, a methyl group, ethyl group, propyl group and butyl group.

Cyanoalkyl groups are preferably cyanoalkyl groups prepared by incorporating a cyano group into an alkyl group of about 1 to 4 carbon atoms, including, for example, a cyanoethyl group and a cyanobutyl group.

Aminoalkyl groups are preferably aminoalkyl groups prepared by incorporating an amino group into an alkyl group of about 1 to 4 carbon atoms, which include, for example, an aminoethyl group and an aminobutyl group.

Imidazoles (V) include, for example, imidazole, 1-methylimidazole, 1-ethylimidazole, 2-ethylimidazole, 2-phenylimidazole, 2-ethyl-4-methylimidazole, 2,4-dimethylimidazole, 2-phenyl-4-methyl-5-hydroxymethylimidazole, 1-cyanoethyl-2-phenylimidazole, 4,5-imidazole dicarboxylic acid, 1-aminoethyl-2-methylimidazole, 2-phenylimidazole, 1-benzyl-2-phenylimidazole, and 4-formylimidazole.

In particular, imidazoles wherein $X_1$ is an alkyl group and $X_2$ to $X_4$ are a hydrogen atom are preferably used inasmuch as a liquid crystalline polyester obtained is good in color tone. Among these, 1-methylimidazole is preferably used from the view point of cost performance and availability.

Further, in 4,4'-diacyloxybiphenyls of Formula (III), $R_3$ and $R_4$ represent independently alkyl groups of 1 to 5 carbon atoms. Alkyl groups of 1 to 5 carbon atoms include the same groups as described above. 4,4'-Diacyloxybiphenyls include, for example, 4,4'-diacetoxybiphenyl, 4,4'-dipropoxybiphenyl, 4,4'-dibutyroxybiphenyl and 4,4'-valeroxybiphenyl. These 4,4'-diacyloxybiphenyls may be used singly or in combination of two or more species. Among these, 4,4'-diacetoxybiphenyl is preferably used from the viewpoint of price and availability.

Phthalic acids of Formula (IV) include, for example, terephthalic acid, isophthalic acid and phthalic acid. Among these, terephthalic acid or isophthalic acid is preferably used from the viewpoint of liquid crystalinity. And it is preferable to use terephthalic acid singly or a mixture of terephthalic acid and isophthalic acid from the viewpoint of the improvement of heat resistance.

The amount of 4-acyloxybenzoic acid (I) to be used is preferably from 30 mol % to 90 mol % with respect to the total amount of 4-acyloxybenzoic acid (I) and 2-acyloxy-6-naphthoic acid (II), or with respect to the total amount of 4-acyloxybenzoic acid (I), 2-acyloxy-6-naphthoic acid (II), 4,4'-diacyloxybiphenyl (III) and phthalic acid (IV), and more preferably from 50 mol % to 80 mol %.

When the used amount of 4-acyloxybenzoic acid (I) is less than 30 mol %, the strength of a liquid crystalline polyester obtained may tend to decrease; when the amount exceeds 90 mol %, the fluidity may tend to decrease.

The amount of imidazole (V) to be used is preferably 0.001 part by weight or more in case where the total amount of 4-acyloxybenzoic acid (I) and 2-acyloxy-6-naphthoic acid (II) is 100 parts by total weight, or in case where the total amount of 4-acyloxybenzoic acid (I), 2-acyloxy-6-naphthoic acid (II), 4,4'-dihydroxybiphenyl(III), and phtalic acid(IV) is 100 parts by total weight. The amount of imidazole (V) to be used is more preferably 0.002 part by weight or more, still more preferably 0.01 part by weight or more. And the amount of imidazole (V) is preferably 1 part by weight or less, more preferably 0.5 part by weight or less.

When the amount of imidazole (V) to be used is below 0.001 part by weight, the addition effect may tend to decrease; when the amount exceeds 1 part by weight, the control of the copolymerization may be difficult.

The copolymerization can be performed, for example, by mixing a 4-acyloxybenzoic acid (I), a 2-acyloxy-6-naphthoic acid (II) and an imidazole (V), and heat melting the resulting mixture preferably at 200° C. or more, more preferably at 250° C. or more, and preferably at 400° C. or less, more preferably 320° C. or less. The reaction may be carried out under a normal pressure or under a reduced pressure. The copolymerization is preferably carried out while discharging the lower aliphatic acids generated by the reaction into the outside of the reaction system.

The copolymerization may be carried out by means of a process that includes (1) allowing to react in a melted state until a resin of a specified molecular weight (about 10,000 to about 50,000) is obtained, or (2) allowing to react in a melted state until oligomers of low molecular weights (about 1,000 to about 10,000) are yielded and subsequently polymerizing the oligomers in a solid state until a specified degree of polymerization is obtained. The process of polymerizing oligomers in a solid state until a prescribed molecular weight (about 10,000 to about 50,000) is obtained as described in (2) is preferable from the viewpoint of handling.

Methods for copolymerization in a solid state of (2) include, for example, a method that involves agitating a powder of oligomers in a solvent having high boiling point such as a mixture of diphenyl and diphenyl ether, or diphenyl sulfone, and then removing the solvent to obtain a liquid crystalline polyester, and a method that involves changing the shape, for example, by pelletizing a powder of the oligomers directly or using a granulator, and subsequently heat treating in an inert gas atmosphere or under a reduced pressure for 1 to 20 hours.

Apparatuses used in heat treatment include, for example, a known dryer, a reactor, an inert oven, a mixer and an electric furnace.

A liquid crystalline polyester thus obtained of the present invention comprises a structure unit indicated by Formula (VI) and Formula (VII), or comprises a structure unit indicated by Formula (VI), (VII), (VIII) and (IX).

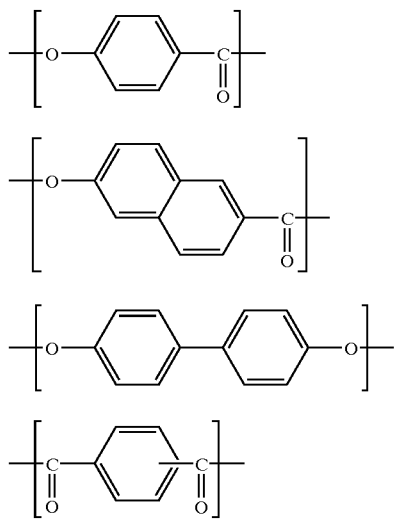

Here, the structure unit indicated by Formula (VI) is a structure unit derived from a 4-acyloxybenzoic acid (I), the structure unit indicated by Formula (VII) is a structure unit derived from a 2-acyloxy-6-naphthoic acid (II), Formula (VIII) is a structure unit derived from 4,4'-diacyloxybiphenyl (III) and Formula (IX) is a structure unit derived from phthalic acid (IV).

A liquid crystalline polyester comprising a structure unit indicated by Formula (VI) and Formula (VII) can be used in production of a molded article having high mechanical strengths in which the melted liquid crystalline polyester has sufficient fluidity in thin-walled portions when the thin-walled molded article is manufactured. A liquid crystalline polyester comprising a structure unit indicated by Formula (VI), Formula (VII), Formula (VIII) and Formula (IX) can be used in production of a molded article having sufficient mechanical strengths in which the melted liquid crystalline polyester has sufficient fluidity in thin-walled portions when the thin-walled molded article is manufactured The weight-average molecular weight of the liquid crystalline polyester is not particularly limited, but is desirable from about 10,000 to about 50,000.

The liquid crystalline polyester is normally used as a liquid crystalline polyester resin composition containing a filler. Fillers to be used include, for example, fibrous, granular and plate-like inorganic fillers and organic fillers.

Fibrous inorganic fillers include, for example, ceramics fibers such as glass fiber, carbon fiber, chirano fiber, wollastonite, potassium titanate fiber and aluminum boride, and metal fibers. Of these, glass fiber is preferably used from the viewpoint of cost efficiency and performance.

Granular inorganic fillers include, for example, silicates such as carbon black, graphite, silica, quartz powder, glass beads, mild glass fiber, glass balloon, glass powder, calcium silicate, aluminum silicate, talc, clay, diatomite and wollastonite; and iron oxide, titanium oxide, zinc oxide, antimony trioxide, alumina, calcium sulfate and other metal powders.

Plate-like inorganic fillers include, for example, mica, glass flakes, and a variety of metal foils.

Organic fillers include, for example, heat-resistant high-strength fibers such as aromatic polyesters, aromatic polyimides, polyimides, etc.

These fillers may be treated with well-known surface treating agents in advance. In addition, a converging agent or the like may be used when fibrous inorganic filler is used.

The amount of inorganic filler and/or organic filler in a liquid crystalline polyester resin composition is preferably from 10 to 50% by weight with respect to the amount of the resin composition, and more preferably from 20 to 40% by weight. When the amount of the filler is less than 10% by weight, the improvement of the heat resistance may be insufficient; when the amount exceeds 50% by weight, fluidity in the thin wall may decrease or the abrasion of the cylinder or mold of a molder may occur.

To the liquid crystalline polyester resin composition may be added one species of normal additives including a mold release improving agent such as a fluorine resin or a metal soap; a coloring agent such as a dye or a pigment; an antioxidant; a heat stabilizer; an ultraviolet absorber; an antistatic agent; and a surfactant. In addition, there may be added one of species having external lubricating performance such as a higher fatty acid, a higher fatty acid ester, a higher fatty metal salt and a fluorocarbon-based surfactant.

Additionally, there may be added one or more of polyamides, polyesters, polyphenylene sulfide, polyether ketones, polycarbonates, polyphenylene ether and derivatives thereof, thermoplastic resins such as polysulfones, polyether sulfones and polyether imides, and thermosetting resins such as phenol resins, epoxy resins and polyimide resins.

The method of mixing a liquid crystalline polyester resin and an inorganic and/or an organic filler is not particularly limited. For example, a liquid crystalline polyester resin and an inorganic filler and/or an organic filler can be separately fed into a melting mixer, or these ingredients can be pre-mixed by means of a mortar, a Henschel mixer, a ball mill, or a ribbon blender, and then the resulting mixture can be supplied to a melting mixer.

A liquid crystalline polyester resin composition obtained by mixing an organic filler and/or an inorganic filler with a liquid crystalline polyester is molded by a method such as injection molding, extrusion molding, inflation molding, or blow molding. Among these, injection molding is preferable method from the viewpoint of producing final product in only a single process.

A 4-acyloxybenzoic acid (I), a 2-acyloxy-6-naphthoic acid (II) and a 4,4'-diacyloxybiphenyl (III), as raw materials of a liquid crystalline polyester, can be manufactured, for example, by the following process.

A 4-acyloxybenzoic acid (I) can be obtained by reacting 4-hydroxybenzoic acid with a lower fatty acid anhydride of 4 to 12 carbon atoms. Examples of lower fatty acid anhydrides of 4 to 12 carbon atoms include acetic anhydride, propionic anhydride, butyric anhydride, isobutylic anhydride, valeric anhydride and pivalic anhydride. These anhydrides can be used singly or in a mixture of two or more kinds. From the viewpoint of the price and handling, acetic anhydride, propionic anhydride, butyric anhydride and isobutylic anhydride are preferable and acetic anhydride is more preferable.

A 2-acyloxy-6-naphthoic acid (II) can be obtained by reacting 2-hydroxy-6-naphthoic acid with a lower fatty acid anhydride of 4 to 12 carbon atoms. Lower fatty acid anhydrides of 4 to 12 carbon atoms include the same anhydrides mentioned above.

A 4,4'-diacyloxybiphenyl (III) can be obtained by reacting 4,4'-dihydroxybiphenyl with a lower fatty acid anhydride of 4 to 12 carbon atoms. Lower fatty acid anhydrides of 4 to 12 carbon atoms include the same anhydrides mentioned above.

4-Hydroxybenzoic acid, 2-hydroxy-6-naphthoic acid and 4,4'-diacyloxybiphenyl may be individually reacted with lower fatty acid anhydrides of 4 to 12 carbon atoms, or may be reacted, in a mixed state of these, with lower fatty acid anhydrides of 4 to 12 carbon atoms.

The ratio of lower fatty acid anhydride to be used is preferably 1 time or more in mole, more preferably 1.1 times in mole, and is preferably 1.5 times or less in mole, more preferably 1.2 times or less, with respect to the mole number of the hydroxyl group of 4-hydroxybenzoic acid, 2-hydroxy-6-naphthoic acid or 4,4'-dihydroxybiphenyl, or when the mixture is used, with respect to the total mole number of the hydroxyl group of 4-hydroxybenzoic acid, 2-hydroxy-6-naphthoic acid and 4,4'-dihydroxybiphenyl.

The reaction is normally conducted without solvent usually at a reaction temperature of 100° C. or higher, preferably at 130° C. or higher, and usually at 200° C. or lower, preferably at 160° C. or lower.

The reaction is preferably carried out in the presence of a catalyst including a tertiary amine such as pyridine, triethylamine, N,N-dimethylaniline, 4-aminodimethylpyridine, N-methylimidazole, or N-ethylimidazole. Of these, the reaction is preferably conducted in the presence of N-methylimidazole, or N-ethylimidazole from the viewpoint of suppressing by-products of colored components.

When mixture of 4-hydroxybenzoic acid, 2-hydroxy-6-naphthoic acid and 4,4'-dihydroxybiphenyl are reacted with lower fatty acid anhydrides of 4 to 12 carbon atoms to produce the mixture of a 4-acyloxybenzoic acid (I), a 2-acyloxy-6-naphthoic acid and 4,4'-diacyloxybiphenyl, an imidazole (III) may be directly added to the mixture thus obtained to polymerize and produce a liquid crystalline polyester of the present invention.

EXAMPLES

The present invention will be discussed hereinafter by means of examples; however, the invention is not limited to the examples.

In addition, the characteristics of the liquid crystalline polyesters obtained in Examples and Comparative Examples were evaluated by the following methods.

Characteristics of Resin (1) Tensile Strength

It was measured using an ASTM No.4 dumbbell in accordance with ASTM D638

(2) Thin Wall Flow Length

The lengths of flow of resins were compared when the resins were molded under the same conditions to evaluate the molding workability of the resins. More specifically, a resin was injected by means of a thin wall flow length measuring mold as shown in FIG. 1 at a cylinder temperature of 350° C. and a mold temperature of 130° C. The length of each flow thus obtained was measured and the average value calculated was taken as the thin wall fluidity length. The larger the value of a thin wall fluidity length, the better the thin wall moldability.

Example 1

To a reactor equipped with an agitator, a torque meter, a nitrogen-introducing tube, a thermometer and a reflux condenser were fed 1109 g (8.03 mol) of 4-hydroxybenzoic acid, 558 g (2.97 mol) of 2-hydroxy-6-naphthoic acid, and 1235 g (12.1 mol) of acetic anhydride. After the air in the reactor was fully replaced by nitrogen gas, the mixture was heated to 150° C. over 15 minutes under a flow of nitrogen gas and was refluxed for 3 hours at that temperature.

Thereafter, to the material was added 0.75 g of N-methylimidazole and the resultant material was heated to 320° C. over 2 hours and 50 minutes while removing a by-product of acetic acid and unreacted acetic anhydride by distillation. The point of observing a rise in torque was regarded as the completion of the reaction and then the contents were taken out. The solid matter thus obtained was cooled to room temperature, was ground with a grinder, was heated under a nitrogen atmosphere from room temperature to 250° C. over 1 hour and then from 250° C. to 275° C. over 5 hours. The material was polymerized in a solid phase at 275° C. for 3 hours. An observation using a polarizing microscope revealed that the obtained resin exhibits optical anisotropy at the time of melting (350° C.).

Milled glass fiber (EFH-7501) available from Central Glass was added and mixed into the obtained resin so that the glass became 40% by weight of the whole, and then resulting material was pelletized at 300° C. by a two-axis extrusion machine (PCM-30, Ikegai Tekko Co., Ltd.). The pellets thus obtained were molded by injection at a cylinder temperature of 310° C. and a mold temperature of 130° C. via an injection molder, a PS40E5ASE type available from Nissei Plastic Industrial Co., Ltd. The characteristics (tensile strength, thin wall flow length) of the resin were evaluated. The results are listed in Table 1.

Example 2

To a reactor equipped with an agitator, a torque meter, a nitrogen-introducing tube, a thermometer and a reflux condenser were fed 1215 g (8.8 mol) of 4-hydroxybenzoic acid, 414 g (2.2 mol) of 2-hydroxy-6-naphthoic acid, and 1235 g (12.1 mol) of acetic anhydride. After the air in the reactor was fully replaced by nitrogen gas, the mixture was heated to 150° C. over 15 minutes under a flow of nitrogen gas and was refluxed for 3 hours at that temperature.

Thereafter, to the material was added 0.27 g of N-methylimidazole and the resultant material was heated to 320° C. over 2 hours and 50 minutes while removing a by-product of acetic acid and unreacted acetic anhydride by distillation. The point of observing a rise in torque was regarded as the completion of the reaction and then the contents were taken out. The solid matter thus obtained was cooled to room temperature, was ground with a grinder, was heated under a nitrogen atmosphere from room temperature to 250° C. over 1 hour and then from 250° C. to 287° C. over 5 hours. The material was polymerized in a solid phase at 287° C. for 3 hours. An observation using a polarizing microscope revealed that the obtained resin exhibits optical anisotropy at the time of melting (350° C.).

Milled glass fiber (EFH-7501) available from Central Glass was formulated and mixed into the obtained resin so that the glass became 40% by weight of the whole, and then resulting material was pelletized at 330° C. by a two-axis extrusion machine (PCM-30, Ikegai Tekko Co., Ltd.). The pellets thus obtained were molded by injection at a cylinder temperature of 340° C. and a mold temperature of 130° C. via an injection molder, a PS40E5ASE type available from Nissei Plastic Industrial Co., Ltd. The characteristics (tensile strength, thin wall flow length) of the resin were evaluated. The results are listed in Table 1.

Example 3

To a reactor equipped with an agitator, a torque meter, a nitrogen-introducing tube, a thermometer and a reflux condenser were fed 911.6 g (6.6 mol) of 4-hydroxybenzoic acid, 124.2 g (0.66 mol) of 2-hydroxy-6-naphthoic acid, 348.2 g (1.87 mol) of 4,4'-dihydroxybiphenyl, 310.7 g (1.87 mol) of terephthalic acid and 1235 g (12.1 mol) of acetic anhydride. After the air in the reactor was fully replaced by nitrogen gas, the mixture was heated to 150° C. over 15 minutes under a flow of nitrogen gas and was refluxed for 3 hours at that temperature.

Thereafter, to the material was added 0.339 g of N-methylimidazole and the resultant material was heated to 320° C. over 2 hours and 50 minutes while removing a by-product of acetic acid and unreacted acetic anhydride by distillation. The point of observing a rise in torque was regarded as the completion of the reaction and then the contents were taken out. The solid matter thus obtained was cooled to room temperature, was ground with a grinder, was heated under a nitrogen atmosphere from room temperature to 260° C. over 1 hour and then from 260° C. to 300° C. over 10 hours. The material was polymerized in a solid phase at 300° C. for 3 hours. An observation using a polarizing microscope revealed that the obtained resin exhibits optical anisotropy at the time of melting (350° C.).

Chopped glass fiber (CS03JAPX-01) available from Asahi Fiber Glass was added and mixed into the obtained resin so that the glass became 30% by weight of the whole, and then resulting material was pelletized at 320° C. by a two-axis extrusion machine (PCM-30, Ikegai Tekko Co., Ltd.). The pellets thus obtained were injection molded at a cylinder temperature of 340° C. and a mold temperature of 130° C. via an injection molder, a PS40E5ASE type available from Nissei Plastic Industrial Co., Ltd. The characteristics (tensile strength, thin wall flow length) of the resin were evaluated. The results are listed in Table 2.

Example 4

The resin was obtained as in EXAMPLE 3, except that 0.85 g of N-methylimidazole was added, the solid matter thus obtained was heated under a nitrogen atmosphere from room temperature to 260° C. over 1 hour and then from 260° C. to 300° C. over 5 hours and was polymerized in a solid phase at 300° C. for 3 hours. The resin thus obtained was evaluated and the result was listed in Table 2.

Comparative Example 1

A resin was obtained as in Example 1, except that N-methylimidazole was not used during polymerization, and then was evaluated. The results are given in Table 1.

Comparative Example 2

A resin was obtained as in Example 2, except that N-methylimidazole was not used during polymerization, and then was evaluated. The results are given in Table 1.

Comparative Example 2

A resin was obtained as in Example 3, except that N-methylimidazole was not used during polymerization, and then was evaluated. The results are given in Table 2.

TABLE 1

| | | | EXAMPLE 1 | EXAMPLE 2 | COMPARATIVE EXAMPLE 1 | COMPARATIVE EXAMPLE 2 |
|---|---|---|---|---|---|---|
| Added amount | PHBA | Mol | 8.03 | 8.80 | 8.03 | 8.80 |
| | BONA | Mol | 2.97 | 2.20 | 2.97 | 2.20 |
| | 1 MI | Part by weight (to PHBA + BONA) | 0.05 | 0.017 | 0 | 0 |
| Tensile strength | | | 181 | 177 | 171 | 167 |
| Thin wall flow length | | | 14 | 13 | 10 | 11 |

PHBA: 4-hydroxybenzoic acid
BONA: 2-hydroxy-6-naphtoic acid
1 MI: N-methylimidazole

TABLE 2

| | | | EXAMPLE 3 | EXAMPLE 4 | COMPARATIVE EXAMPLE 3 |
|---|---|---|---|---|---|
| Added amount | PHBA | Mol | 6.60 | 6.60 | 6.60 |
| | BONA | Mol | 0.66 | 0.66 | 0.66 |
| | BHL | Mol | 1.87 | 1.87 | 1.87 |
| | TP | Mol | 1.87 | 1.87 | 1.87 |
| | 1 MI | Part by weight (to PHBA + BONA + BHL + TP) | 0.02 | 0.05 | 0 |
| Tensile strength | | | 147 | 144 | 149 |
| thin wall flow length | | | 16.2 | 17.6 | 15.7 |

PHBA: 4-hydroxybenzoic acid
BONA: 2-hydroxy-6-naphtoic acid
BHL: 4,4'-dihydroxybiphenyl
TP: terephthalic acid
1 MI: N-methylimidazole According to the present invention, there can be provided a liquid crystalline polyester that can be used in production of a molded article having sufficient mechanical strengths in which the melted liquid crystalline polyester is good in fluidity in thin-walled portions when the thin-walled molded article is manufactured.

What is claimed is:

1. A method for producing a liquid crystalline polyester comprising copolymerizing a 4-acyloxybenzoic acid of Formula (I):

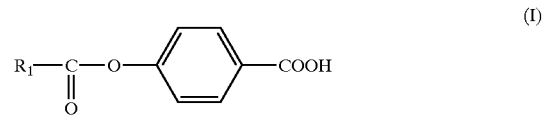

(wherein $R_1$ represents an alkyl group of 1 to 5 carbon atoms), and a 2-acyloxy-6-naphthoic acid of Formula (II):

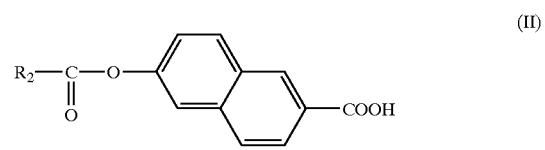

(wherein $R_2$ is an alkyl group of 1 to 5 carbon atoms), in the presence of imidazoles of Formula (V):

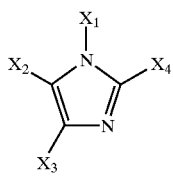
(V)

(wherein $X_1$ to $X_4$ represent a hydrogen atom, or each independently represents an alkyl group, hydroxymethyl group, cyanoalkyl group, carboxyl group, aminoalkyl group, phenyl group, benzyl group or formyl group).

2. The method for producing a liquid crystalline polyester comprising copolymerizing 4-acyloxybenzoic acid of the Formula (I), 2-acyloxy-6-naphthoic acid of the Formula (II), a 4,4'-diacyloxybiphenyl of Formula (III):

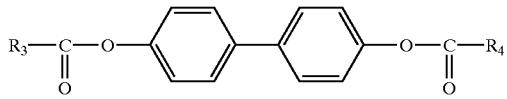
(III)

(wherein $R_3$ and $R_4$ represent independently alkyl groups of 1 to 5 carbon atoms),
and a phthalic acid of Formula (IV):

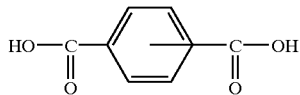
(IV)

in the presence of imidazoles of Formula (V):

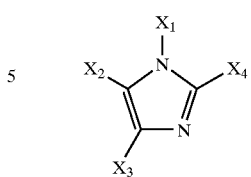
(V)

(wherein $X_1$ to $X_4$ represent a hydrogen atom, or each independently represents an alkyl group, hydroxymethyl group, cyanoalkyl group, carboxyl group, aminoalkyl, phenyl group, benzyl group or formyl group).

3. The method for producing a liquid crystalline polyester according to claim 1 or 2, wherein 4-acyloxybenzoic acid is obtained by the reaction of 4-hydroxybenzoic acid and a lower fatty acid anhydride of 4 to 12 carbon atoms.

4. The method for producing a liquid crystalline polyester according to claim 1 or 2, wherein 2-acyloxy-6-naphthoic acid is obtained by the reaction of 2-hydroxy-6-naphthoic acid and a lower fatty acid anhydride of 4 to 12 carbon atoms.

5. The method for producing a liquid crystalline polyester according to claim 2, wherein 4,4'-diacyloxybiphenyl is obtained by the reaction of 4,4'-dihydroxybiphenyl and a lower fatty acid anhydride of 4 to 12 carbon atoms.

6. The method for producing a liquid crystalline polyester according to claim 1 or 2, wherein $X_1$ is alkyl group.

7. A liquid crystalline polyester obtained by the method according to claim 1 or 2.

* * * * *